Oct. 24, 1972 D. K. BREDESON Re. 27,515

MECHANICAL SCREW PRESS

Original Filed Sept. 9, 1968

INVENTOR

DEAN K. BREDESON

BY

Marechal, Biebel, French & Bugg

ATTORNEYS

United States Patent Office

Re. 27,515
Reissued Oct. 24, 1972

27,515
MECHANICAL SCREW PRESS

Dean K. Bredeson, % The French Oil Mill Machinery Company, P.O. Box 920, Piqua, Ohio 45356

Original No. 3,518,936, dated July 7, 1970, Ser. No. 758,300, Sept. 9, 1968. Application for reissue May 19 1971, Ser. No. 144,839
Int. Cl. B30b *9/12, 15/00*
U.S. Cl. 100—117 10 Claims

Matter enclosed in heavy brackets [ ] appears in the original patent but forms no part of this reissue specification; matter printed in italics indicates the additions made by reissue.

ABSTRACT OF THE DISCLOSURE

A screw press has a cage with spaced screen bars defining drainage slots therebetween. A rotatable screw extends through the cage and includes a shaft supporting a plurality of worms with axially spaced helical flights, and breaker bars are mounted on the cage projecting between the flights to resist rotation of the material with the screw. An annular choke member is connected to the cage intermediate the inlet and discharge ends and has a tapered inner surface which cooperates with a collar mounted on the shaft between a set of adjacent flights to define an intermediate restrictive orifice. The choke member is adjustable exially or interchangeable with other choke members for varying the size of the orifice to obtain the optimum progressive expression of liquid from the material.

BACKGROUND OF THE INVENTION

In dewatering or expressing other liquid from a material with a mechanical screw press, it is common to employ an adjustable choke or cone at the discharge end of the press to define an annular discharge orifice which can be varied for controlling the back pressure within the pressing chamber. It is also desirable to construct or design the screw press according to the specific material to be pressed so that the progressive increase of pressure on the material within the press is such that it produces the most effective expression of liquid from the material and the moisture content in the discharged material is minimized. With some materials, however, the specific design of press cannot be precisely determined prior to actual testing of the material, and the adjustable choke or cone at the discharge end of the press may not provide for sufficient pressure and liquid expression within the forward portion of the pressing chamber so that the maximum amount of remaining liquid or moisture can be removed from the material within the discharge end portion of the press.

SUMMARY OF THE INVENTION

The present invention is directed to an improved mechanical screw press which is ideally suited for dewatering and drying elastomeric materials such as synthetic or natural rubber, but which can also be used for removing liquid from other materials. In general, the screw press of the invention provides for adjustably controlling the backup pressure within the press at one or more points intermediate the inlet and discarge ends of the press and thus provides for controlling the progressive buildup of pressure within the pressing chamber and the corresponding removal of moisture from the material so that the material discharged from the press has a minimum moisture content.

In accordance with one embodiment of the invention, the screw press incorporates an annular choke member which is mounted on the cage intermediate the inlet and discharge ends and has a tapered inner surface which cooperates with a tapered outer surface formed on a collar mounted on the screw shaft between an adjacent set of worm flights to define an annular intermediate orifice. The choke member is infinitely adjustable in an axial direction to vary the size of the intermediate orifice and thereby controls the backup pressure of the material within the portion of the pressing chamber forward of the choke member. A pressure relief zone immediately follows the intermediate orifice, and a worm with a higher pitch flight may be mounted on the shaft within the relief zone to advance the material quickly into the succeeding portion of the pressing chamber.

It is also within the scope of the invention to mount a split annular choke member on the cage intermediate the ends of the pressing chamber for cooperating with a collar mounted on the screw shaft to define an intermediate restrictive orifice, and to provide for interchangement of different size choke members to vary the area of the restriction orifice. In this embodiment, however, it is necessary to open the cage for interchanging choke members. Furthermore, it is within the scope of the invention to provide a plurality or series of intermediate choke members at axially spaced intervals along the pressing chamber for providing more precise control over the progressive increase or buildup of pressure on the material within the pressing chambers.

DESCRIPTION OF THE PREFERRED EMBODIMENT

Figure 1:
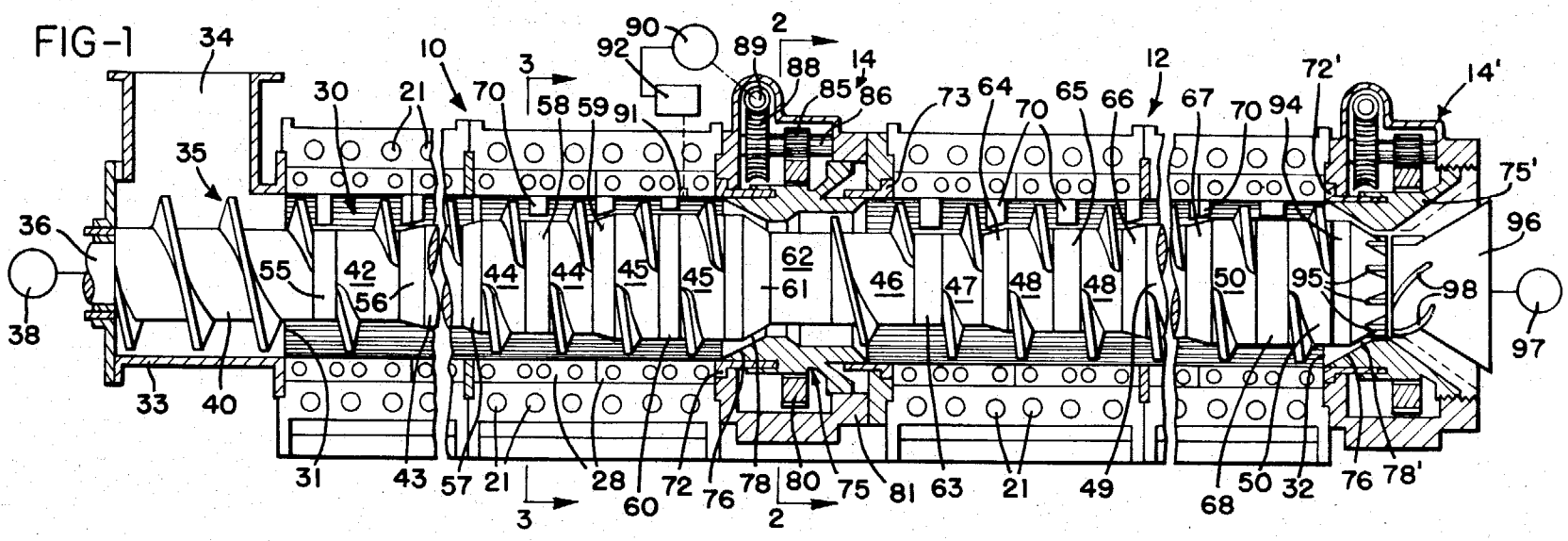
FIG. 1 is an axial section view of a screw press constructed in accordance with the invention.

The screw press shown in FIG. 1 includes a first stage 10 and a second stage 12 which are rigidly connected by an annular housing 14. Each press stage 10 and 12 includes two semi-cylindrical mating cage sections 15 (FIG. 3) each having a plurality of parallel spaced arcuate ribs 16 (FIG. 3) integrally connected by a longitudinally extending cage member 18. The cage sections 15 are clamped together by a series of tie bolts (not shown) which extend within the holes 21.

A series of axially extending elongated screen bars 25 are mounted on the ribs 16 of each cage section 15 and are circumferentially spaced to define longitudinally extending drainage slots or openings 26 therebetween. The screen bars 25 are secured within each cage section by longitudinally extending retaining bars 28 and cooperate to define a cylindrical pressing chamber 30 extending through both stages of the press and having an inlet 31 and a discharge end 32. A feed housing 33 is connected to the inlet end 31 and has an inlet opening 34 for receiving the material to be pressed.

An elongated screw 35 extends through the pressing chamber 30 and includes a shaft 36 which is connected to a suitable drive 38. A feed worm 40 is mounted on the shaft 36 within the feed housing 32, and a series of pressure worms 42–50 are successively mounted on the shaft 36 within the pressing chamber 30. Each worm includes a cylindrical body 51 (FIG. 3) and a helical flight 52, and a series of annular collars 55–68 are mounted on the shaft 36 interspaced between the worms 42–50 to define interruptions or gaps between the flights 52.

The bodies of the worms within each stage of the press progressively increases in diameter, and several of the collars 55–68 have tapered outer surfaces which cooperate with the increasing size of the worm bodies to provide a progressively decreasing volumetric space within each stage of the press. A series of breaker bars 70 are secured to the retaining bars 28 and project inwardly into the pressing chamber 30 in the areas of the annular collars 55–68 and between the worm flights to minimize rotation of the material being pressed within the screw 35

The housing 14 supports a set of generally cylindrical bearing members 72 and 73 which, in turn, support an annular choke member 75 having a tapered or frustoconical inner surface 76 surrounding the outer tapered surface of the collar 61 and cooperating therewith to define an annular restrictive orifice 78 between the second worm 45 and the worm 46.

The choke member 75 has helical external threads which engage internal threads formed within a ring gear 80 rotatably supported by annular bearing rings (not shown). A pinion 85 engages the ring gear 80 and is rigidly secured to a shaft 86 on which is mounted a worm gear 88 intermeshing with a worm 89. Rotation of the worm 89 by a reversible drive motor 90, produces rotation of the ring gear 80 which, in turn, causes the choke member to move axially for varying the area of the restriction orifice 78. As schematically shown in FIG. 1, the motor 90 may be automatically controlled by a pressure and/or temperature sensing device 91 which is installed immediately upstream of the choke member 75 within an adjacent screen bar 25 or breaker bar 70 and connected to the motor 90 through a transistorized controller 92.

A housing 14' which is constructed similar to the housing 14, is mounted on the discharge end 32 of the press stage 12 and supports an axially movable discharge choke member 75' having a tapered inner surface 76' surrounding the outer tapered surface of a final discharge sleeve 94 to define a restriction discharge orifice 78'. The discharge choke member 75' is adjustable axially in the same manner as described above for the choke member 75 for adjusting the area of the annular discharge orifice 78'. As disclosed in Pat. No. 3,285,163 issued to the assignee of the present invention, a series of circumferentially spaced lugs 95 project from the final discharge sleeve 94 for cooperation with a shredder 96 driven by an auxiliary drive 97 and having peripherally spaced curved blades 98 spaced in close relation to the lugs 95.

In operation of the press for dewatering or drying chunks of rubber material, the material is fed into the inlet opening 33 and is advanced into the pressing chamber 30 by the feed worm 40. By adjustably positioning the intermediate choke member 75, the area of the orifice 78 is selected to produce a back pressure which provides for substantial removal of liquid within the first stage 10 of the press. As the material flows through the intermediate orifice 78, it expands somewhat into the annular space surrounding the sleeve 62 and is then picked up by the higher pitched worm 46 and fed into the second stage 12 of the press. By adjustably setting the discharge choke member 75', additional moisture is removed within the second stage 12 so that relatively dry material flows through the discharge orifice 78' to be shredded into small pieces by the shredder 96.

One primary advantage provided by the adjustable intermediate orifice 78 is that it provides for more precise control over the discharge of liquid from the material within the pressing chamber 30. That is, by properly setting the area of the intermediate orifice 78, a higher percentage of liquid or moisture is expressed from the material within the first stage 10 of the press so that a higher percentage of remaining moisture can be expressed or removed from the material in the second stage 12 of the press.

Figure 4:
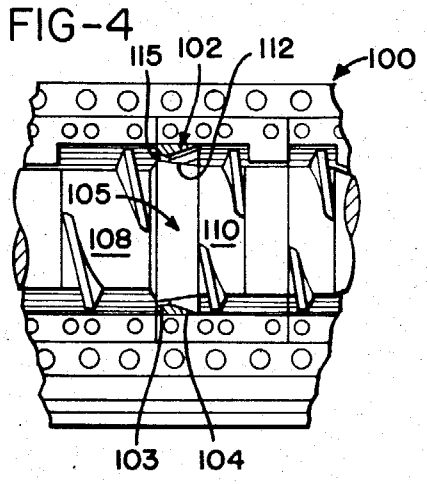
FIG. 4 is a fragmentary axial section of a screw press showing another embodiment constructed in accordance with the invention.

It is also within the scope of the invention to form an intermediate orifice in the pressing chamber of a screw press by employing interchangeable annular choke members within the pressing chamber. Thus referring to FIG. 4, the cage 100 supports an annular choke member 102 preferably formed in two mating half sections in a manner similar to the mating sections of the split bearing disclosed in Pat. No. 3,276,354 which issued to the assignee of the present invention. The choke member 102 has a tapered inner surface 103 which extends from a tapered inner surface 104.

A collar 105 is mounted on the screw shaft between a set of worms 108 and 110 and has an outer tapered surface 112 which cooperates with the tapered surface 103 to define an annular intermediate orifice 115 between the worms 108 and 110. Each half section of the choke member 102 has outwardly projecting lugs (not shown) which secure the choke member to the cage 100. When it is desired to change the area of the annular orifice 115, the cage 100 is opened, and each half section of the choke member 102 is removed and replaced by another section to provide a choke member having either a larger or smaller internal diameter. When the choke member 102 is constructed as one annular piece, the screw 35 is first removed before interchanging choke members.

Figure 3:
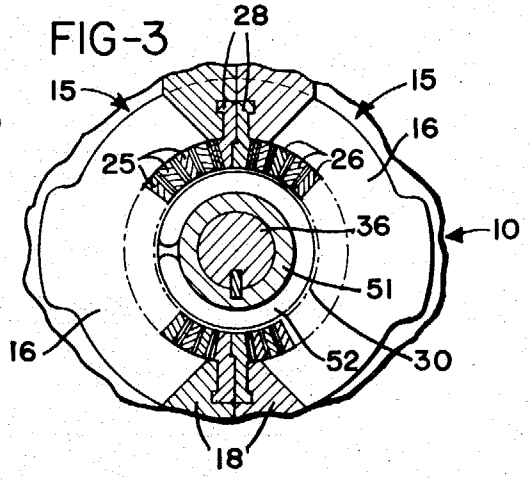
FIG. 3 is a radial section taken generally on the line 3—3 of FIG. 1.
Figure 2:
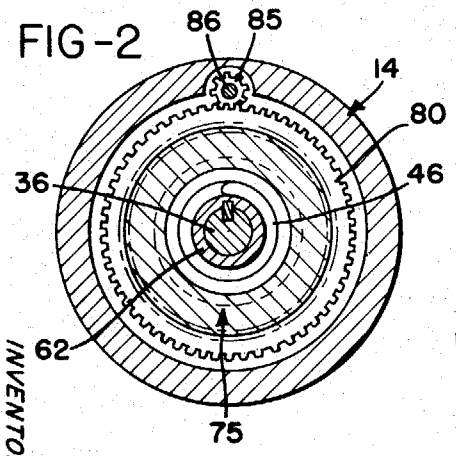
FIG. 2 is a radial section taken generally on the line 2—2 of FIG. 1.

As provided by the embodiment shown in FIGS. 1–3, the area of the intermediate orifice 78 can be infinitely adjusted while the screw press is in operation so that the optimum removal of moisture from the material can be obtained within the first stage 10 of the press. While an axially movable choke member 75 is illustrated in FIG. 1, it is to be understood that an infinitely adjustable choke member may be constructed in other forms without departing from the scope of the invention. For example, an annular choke member may be constructed with a plurality of peripherally spaced and axially extendable pistons which engage an annular internal shoulder formed within the cage and are hydraulically adjustable by displacing a common supply of hydraulic fluid behind the pistons. As mentioned above, it is within the scope of the invention to employ more than one intermediate restrictive orifice between the inlet and discharge ends of the pressing chamber if it is desirable to provide for more precise control over the progressive rate of liquid expressed from the material within the pressing chamber.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. In a mechanical screw press for expressing liquid from a material and including a cage having means defining an elongated pressing chamber with an inlet end and a discharge end and having means defining fluid discharge openings extending through said cage, a rotatable screw extending through said chamber and including an elongated body and a series of longitudinally spaced spiral flights projecting outwardly from said body, means for rotating said screw, means for progressively compressing material within said chamber as it moves toward said discharge end in response to rotation of said screw, and breaker bar means supported by said cage and including portions projecting into said chamber between said flights to resist rotation of the material with said flights as the material is being compressed, the improvement comprising a choke member mounted on said cage intermediate said ends of said pressing chamber and cooperating with said screw to define and intermediate restriction orifice between an adjacent set of said flights, and means for varying the area of said restriction orifice for obtaining optimum discharge of fluid through said openings.

2. A press as defined in claim 1 wherein said means for varying the area of the intermediate said restriction orifice comprises means for adjustably positioning said choke member.

3. A press as defined in claim 2 wherein said screw includes an annular collar having an outer surface, said choke member having a tapered inner surface surrounding said outer surface on said collar in spaced relation to define said orifice, and means for moving said choke member axially to vary said orifice.

4. A press as defined in claim 3 including a ring gear surrounding said choke member, thread means connecting said ring gear to said choke member, and said positioning means including means for rotating said ring gear to provide infinite axial adjustment of said choke member.

5. A press as defined in claim 3 including a reversible motor connected to said means for moving said choke member, means for sensing the condition of the material being compressed within said chamber upstream of said choke member, and a controller operated by said sensing means and connected to actuate said motor.

6. A press as defined in claim 1 wherein said means for varying the area of said restriction orifice includes means on said cage for releasably retaining said coke member to provide for interchanging choke members of different sizes.

7. A press as defined in claim 6 wherein said choke member comprises at least two arcuate sections to provide for conventiently interchanging choke members without removing said screw from said press.

8. In a mechanical screw press for expressing liquid from a material, including a cage having means defining an elongated pressing chamber with an inlet end and a discharge end [and having fluid discharge openings extending through said cage], a rotatable screw extending through said chamber and including an elongated body with spiral flight means projecting outwardly therefrom, means for rotating said screw, means for progressively compressing material within said chamber as it moves toward said discharge end in response to rotation of said screw, and said screw includes at least one annular collar interrupting said flight means, the improvement comprising an annular choke member surrounding said collar and having a tapered inner surface cooperating with said collar to define a restriction orifice intermediate said ends of said pressing chamber, and means for varying the area of said restriction orifice [for obtaining optimum discharge of fluid through said openings].

9. A press as defined in claim 8 wherein said collar has a tapered outer surface which cooperates with said tapered inner surface on said choke member to define said restriction orifice, and said means for varying the area of said orifice include means for moving said choke member axially while the press is operating.

10. A press as defined in claim 8 in combination with a second annular choke member positioned adjacent said discharge end of said press chamber and having a tapered inner surface cooperating with the discharge end of said screw to define an annular discharge orifice, and means for moving said choke member axially for varying the area of said discharge orifice.

References Cited

The following references, cited by the Examiner, are of record in the patented file of this patent or the original patent.

UNITED STATES PATENTS

| | | | |
|---|---|---|---|
| 1,421,282 | 6/1922 | Meakin | 100—148 |
| 2,556,499 | 6/1951 | Killip | 100—148 X |
| 3,092,017 | 6/1963 | French et al. | 100—117 X |
| 3,285,163 | 11/1966 | Burner | 100—150 X |

PETER FELDMAN, Primary Examiner

U.S. Cl. X.R.

100—148